US008478632B2

(12) United States Patent (10) Patent No.: US 8,478,632 B2
Veit et al. (45) Date of Patent: Jul. 2, 2013

(54) SYSTEM AND METHOD FOR DEFINING A SALES PROMOTION

(75) Inventors: Thomas Veit, Kirchheimbolanden (DE); Andreas Walle, Mandelbachtal (DE)

(73) Assignee: SAP AG, Walldorf (DE)

( * ) Notice: Subject to any disclaimer, the term of this patent is extended or adjusted under 35 U.S.C. 154(b) by 1974 days.

(21) Appl. No.: 10/926,843

(22) Filed: Aug. 26, 2004

(65) Prior Publication Data

US 2005/0197899 A1    Sep. 8, 2005

Related U.S. Application Data

(60) Provisional application No. 60/563,284, filed on Apr. 16, 2004, provisional application No. 60/551,221, filed on Mar. 8, 2004.

(51) Int. Cl.
*G06Q 10/00* (2012.01)
*G06Q 30/00* (2012.01)

(52) U.S. Cl.
USPC ........................................ 705/7.35; 705/14.1

(58) Field of Classification Search
USPC ......................................... 705/10, 7.11, 7.35
See application file for complete search history.

(56) References Cited

U.S. PATENT DOCUMENTS

| | | | |
|---|---|---|---|
| 5,313,392 A | 5/1994 | Temma et al. | |
| 5,400,253 A | 3/1995 | O'Connor | |
| 5,832,496 A | 11/1998 | Anand et al. | |
| 5,878,400 A * | 3/1999 | Carter, III | 705/20 |
| 5,880,449 A | 3/1999 | Teicher et al. | |
| 5,930,771 A | 7/1999 | Stapp | |
| 5,933,813 A | 8/1999 | Teicher et al. | |
| 5,974,418 A | 10/1999 | Blinn et al. | |
| 5,999,914 A | 12/1999 | Blinn et al. | |
| 6,029,139 A | 2/2000 | Cunningham et al. | |
| 6,076,071 A | 6/2000 | Freeny, Jr. | |
| 6,397,199 B1 | 5/2002 | Goodwin, III | |
| 6,456,997 B1 | 9/2002 | Shukla | |
| 6,507,851 B1 | 1/2003 | Fujiwara et al. | |
| 6,609,101 B1 | 8/2003 | Landvater | |
| 6,622,125 B1 * | 9/2003 | Cragun et al. | 705/14.52 |
| 6,678,695 B1 | 1/2004 | Bonneau et al. | |
| 6,868,528 B2 | 3/2005 | Roberts | |

(Continued)

FOREIGN PATENT DOCUMENTS

JP    2004-30343 A    1/2004

OTHER PUBLICATIONS

"Validity Periods" SAP Library-Pricing and Conditions (SD-BF-PR).*
"SAP Retail" SAP AG, 2001.*

(Continued)

*Primary Examiner* — Andre Boyce
*Assistant Examiner* — Renae Feacher
(74) *Attorney, Agent, or Firm* — Foley & Lardner LLP

(57) ABSTRACT

A method of defining a sales promotion for a plurality of products includes determining a group of sales promotion sites to be included in the sales promotion from a plurality of sites using a computerized system, wherein the plurality of sites have been previously organized according to a predetermined grouping structure, and wherein the group of sales promotion sites is independent of the predetermined grouping structure. The method also includes determining a list of products associated with the group of sales promotion sites, and determining the products to be included in the sales promotion from the list of products associated with the group of sales promotion sites.

18 Claims, 9 Drawing Sheets

U.S. PATENT DOCUMENTS

| | | | |
|---|---|---|---|
| 6,910,017 | B1 | 6/2005 | Woo et al. |
| 6,980,966 | B1 | 12/2005 | Sobrado et al. |
| 7,085,734 | B2 * | 8/2006 | Grant et al. ............... 705/20 |
| 7,092,929 | B1 * | 8/2006 | Dvorak et al. ............... 705/28 |
| 7,117,165 | B1 | 10/2006 | Adams et al. |
| 7,133,848 | B2 | 11/2006 | Phillips et al. |
| 7,139,731 | B1 | 11/2006 | Alvin |
| 7,155,402 | B1 | 12/2006 | Dvorak |
| 7,251,615 | B2 | 7/2007 | Woo |
| 7,257,544 | B2 | 8/2007 | Rose et al. |
| 7,324,983 | B1 * | 1/2008 | Morris et al. ............... 706/48 |
| 7,424,440 | B1 | 9/2008 | Gupta et al. |
| 2001/0047308 | A1 | 11/2001 | Kaminsky et al. |
| 2001/0049653 | A1 * | 12/2001 | Sheets ............... 705/38 |
| 2002/0023500 | A1 | 2/2002 | Chikuan et al. |
| 2002/0026368 | A1 | 2/2002 | Carter |
| 2002/0059108 | A1 * | 5/2002 | Okura et al. ............... 705/26 |
| 2002/0078159 | A1 | 6/2002 | Petrogiannis et al. |
| 2002/0099597 | A1 | 7/2002 | Gamage et al. |
| 2002/0107713 | A1 | 8/2002 | Hawkins |
| 2002/0123930 | A1 * | 9/2002 | Boyd et al. ............... 705/14 |
| 2002/0147668 | A1 | 10/2002 | Smith et al. |
| 2002/0156667 | A1 | 10/2002 | Bergstrom |
| 2002/0165834 | A1 | 11/2002 | Delurgio et al. |
| 2002/0184116 | A1 | 12/2002 | Tam et al. |
| 2003/0023500 | A1 | 1/2003 | Boies et al. |
| 2003/0028437 | A1 | 2/2003 | Grant et al. |
| 2003/0046120 | A1 | 3/2003 | Hoffman et al. |
| 2003/0046195 | A1 | 3/2003 | Mao |
| 2003/0083925 | A1 | 5/2003 | Weaver et al. |
| 2003/0110072 | A1 * | 6/2003 | Delurgio et al. ............... 705/10 |
| 2003/0120579 | A1 | 6/2003 | Carter, III |
| 2003/0130883 | A1 | 7/2003 | Schroeder et al. |
| 2003/0158791 | A1 | 8/2003 | Gilberto et al. |
| 2003/0171978 | A1 | 9/2003 | Jenkins et al. |
| 2003/0172007 | A1 | 9/2003 | Helmolt et al. |
| 2003/0216969 | A1 * | 11/2003 | Bauer et al. ............... 705/22 |
| 2003/0229502 | A1 | 12/2003 | Woo |
| 2004/0098358 | A1 | 5/2004 | Roediger |
| 2004/0162763 | A1 | 8/2004 | Hoskin et al. |
| 2004/0186783 | A1 | 9/2004 | Knight et al. |
| 2004/0220861 | A1 | 11/2004 | Morciniec et al. |
| 2004/0267674 | A1 | 12/2004 | Feng et al. |
| 2005/0055283 | A1 | 3/2005 | Zarovinsky |
| 2005/0060270 | A1 | 3/2005 | Ramakrishnan |
| 2005/0086122 | A1 | 4/2005 | Cirulli et al. |
| 2005/0096963 | A1 | 5/2005 | Myr et al. |
| 2005/0102192 | A1 | 5/2005 | Gerrits et al. |
| 2005/0102227 | A1 | 5/2005 | Solonchev |
| 2005/0165659 | A1 | 7/2005 | Gruber |
| 2006/0020512 | A1 | 1/2006 | Lucas et al. |
| 2006/0036507 | A1 | 2/2006 | Pujar et al. |
| 2006/0112099 | A1 | 5/2006 | Musgrove et al. |

OTHER PUBLICATIONS

Palmer, Adrian."Principles of Promotion Planning." Principles of Marketing; 2000, p. 413.*

Varadarajan, P "Rajan"."Horizontal Cooperative Sales Promotion: A Framework for Classification and Additional Perspectives" Journal of Marketing; Apr. 1986; 50, 2.*

Jorge M. Silva-Risso, Randolph E. Bucklin, Donald G. Morrison."A Decision Support System for Planning Manufacturers' Sales Promotion Calendars,"Marketing Science, vol. 18, No. 3, Special Issue on Managerial Decision Making (1999), pp. 274-300.*

Abraham et al., "An Implemented System for Improving Promotion Productivity Using Store Scanner Data", Marketing Science, Summer 1993, vol. 12, No. 3, pp. 248-269.

U.S. Appl. No. 60/374,892, filed Apr. 22, 2002, Krajec.

"Beyond Markdown Management", summer/autumn 03, the 4caster, Issue 4, vol. 2, 4 pages.

"Retailers Manage Markdown Challenges Using i2 Solutions", Jan. 13, 2003, NFR 92nd Annual Convention & Expo, 2 pages.

Author unknown, "Staffware and Biomni Join Forces to Provide End A1to A1End E A1Procurement Solution with Enhanced Workflow Capability: Self A1 Service Functionality will Enable Thousands of Transactions to be Handled Daily from the Desktop," M2 Presswire, Coventry, Feb. 6, 2001, 1 page.

Kelkar et al., Price Modeling in Standards for Electronic Product Catalogs Based on XML, 2002, pp. 366 A1375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410 A1420.

Subrahmanyan et al., "Developing optimal pricing and inventory policies for retailers who face uncertain demand", Journal of Retailing, vol. 72, No. 1, Spring, 1996, 15 pages.

http://download.oracle.com/docs/html/A86730_01/hierachi.htm from Oracle Discoverer Administration Edition Administration Guide Release 4.1 for Windows, Chapter 14 Hierarchies, 2002, 23 pages.

Notice of Allowance for U.S. Appl. No. 10/926,844, mail date Mar. 22, 2010, 4 pages.

Office Action for U.S. Appl. No. 10/926,844, mail date May 21, 2009, 28 pages.

Office Action for U.S. Appl. No. 10/926,844, mail date Oct. 26, 2009, 8 pages.

Office Action for U.S. Appl. No. 10/926,844, mail date Nov. 12, 2008, 19 pages.

Office Action for U.S. Appl. No. 10/926,845, mail date May 10, 2010, 16 pages

Office Action for U.S. Appl. No. 10/926,845, mail date May 28, 2009, 20 pages.

Office Action for U.S. Appl. No. 10/926,845, mail date Oct. 28, 2009, 17 pages.

Office Action for U.S. Appl. No. 10/926,845, mail date Oct. 29, 2008, 14 pages.

Office Action for U.S. Appl. No. 10/926,846, mail date May 12, 2009, 16 pages.

Office Action for U.S. Appl. No. 10/926,846, mail date Nov. 23, 2009, 16 pages.

Raju, Jagmohan, The Effect of Price Promotions on Variability in Product Category Sales, Marketing Science, Summer 1992, vol. 11, No. 3, 15 pages.

Office Action for U.S. Appl. No. 10/926,846, mail date Dec. 7, 2010, 19 pages.

Office Action for U.S. Appl. No. 10/926,846, mail date Jun. 15, 2010, 18 pages.

* cited by examiner

SYSTEM AND METHOD FOR DEFINING A SALES PROMOTION

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present description relates generally to the field of systems for and methods of pricing retail products and services. More specifically, the present description relates to systems for and methods of defining sales promotions for retail products and services.

Effective pricing of retail products and services is often a complicated task. In order to maximize profits, not only must revenue be optimized, but also the costs of inventory must be taken into account. One strategy used is to periodically reduce the price of the retail products or services in order to encourage sales of the retail products or services. The amount of the reduction is often set by a sales agent who has had experience in the market for the retail products and services and can, using his or her experience and intuition determine the timing and amount of markdowns.

In particular, the sale of seasonal retail products or services poses a high financial risk for merchants or service providers. This risk is even more acute in the retail business. Each seasonal item can be assigned a specific sales period. When high-fashion and fashion items are involved, the merchant wants to have as little remaining stock as possible at the end of the sales period, as it will be difficult to sell this merchandise even with markdowns. In this case, larger remaining stocks translate to higher losses. In addition to fashion items, such as pink raincoats, this also applies to other products, such as computer hardware.

For less "fashionable" products, the risk is lower because merchants can store any remaining stock and then try to sell it at the normal price again in the same season of the next year. Because storing inventories is expensive, however, merchants will generally prefer to sell their merchandise by the end of the regular sales period.

Merchants often use markdowns to ensure that the merchandise is sold out as completely as possible by the end of a season. Markdowns are price reductions or buyer's incentives aimed at promoting the sale of certain articles. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

As discussed above, effective pricing of products is a complicated task which is often performed manually. For example, price adjustments in planning decisions may be used using manual selection systems. Further, a sales promotion may also be implemented in a manual or automated process. A promotion refers to a special event, retail sale, or other activity designed to reduce inventory. For example, spring sales events, two-for-one promotions, end-of-season sales, clearance sales, etc. are examples of sales promotions which may be used to reduce inventory. Sales promotions are different than a markdown controlling process which is not necessarily tied to an event or special circumstance.

An important objective in the pricing of products is to limit retail sales promotions to a minimum and apply them to the right products at the best suitable times and places and with maximum flexibility while ensuring that nearly all the merchandise is sold by the end of the season. To this end, merchants need to flexibly and efficiently implement and manage sales promotions at varying levels of detail. Thus, there is need for a system for and method of defining a sales promotion that provides for defining the sales promotion based on a grouping of sites, such as geographic locations of stores or distribution systems, wherein the grouping is either independent of or not limited to a particular predefined grouping structure.

SUMMARY OF THE INVENTION

According to an exemplary embodiment, a method of defining a sales promotion for a plurality of products includes determining a group of sales promotion sites to be included in the sales promotion from a plurality of sites using a computerized system, wherein the plurality of sites have been previously organized according to a predetermined grouping structure, and wherein the group of sales promotion sites is independent of the predetermined grouping structure. The method also includes determining a list of products associated with the group of sales promotion sites, and determining the products to be included in the sales promotion from the list of products associated with the group of sales promotion sites.

According to another exemplary embodiment, a program product for defining a sales promotion for a plurality of products includes machine-readable program code for causing, when executed, one or more machines to perform the following method steps: determining a group of sales promotion sites to be included in the sales promotion from a plurality of sites, wherein the plurality of sites have been previously organized according to a predetermined grouping structure, and wherein the group of sales promotion sites is independent of the predetermined grouping structure, determining a list of products associated with the group of sales promotion sites, and determining the products to be included in the sales promotion from the list of products associated with the group of sales promotion sites.

According to another exemplary embodiment, a system for defining a sales promotion for a plurality of products includes means for determining a group of sales promotion sites to be included in the sales promotion from a plurality of sites, wherein the plurality of sites have been previously organized according to a predetermined grouping structure, and wherein the group of sales promotion sites is independent of the predetermined grouping structure. The system also includes means for determining a list of products associated with the group of sales promotion sites, and means for determining the products to be included in the sales promotion from the list of products or services associated with the group of sales promotion sites.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

According to various exemplary embodiments, a method and system for defining a sales promotion are provided that facilitate consolidating promotion data for a plurality of sales promotions into a single promotion for, for example, data reporting purposes. In this way, the system provides for efficient sales promotion definition and management such that sales promotions may be kept to a minimum and applied to the right products at the best suitable times and places and with maximum flexibility while ensuring that nearly all the merchandise is sold by the end of the season.

Figure 1:
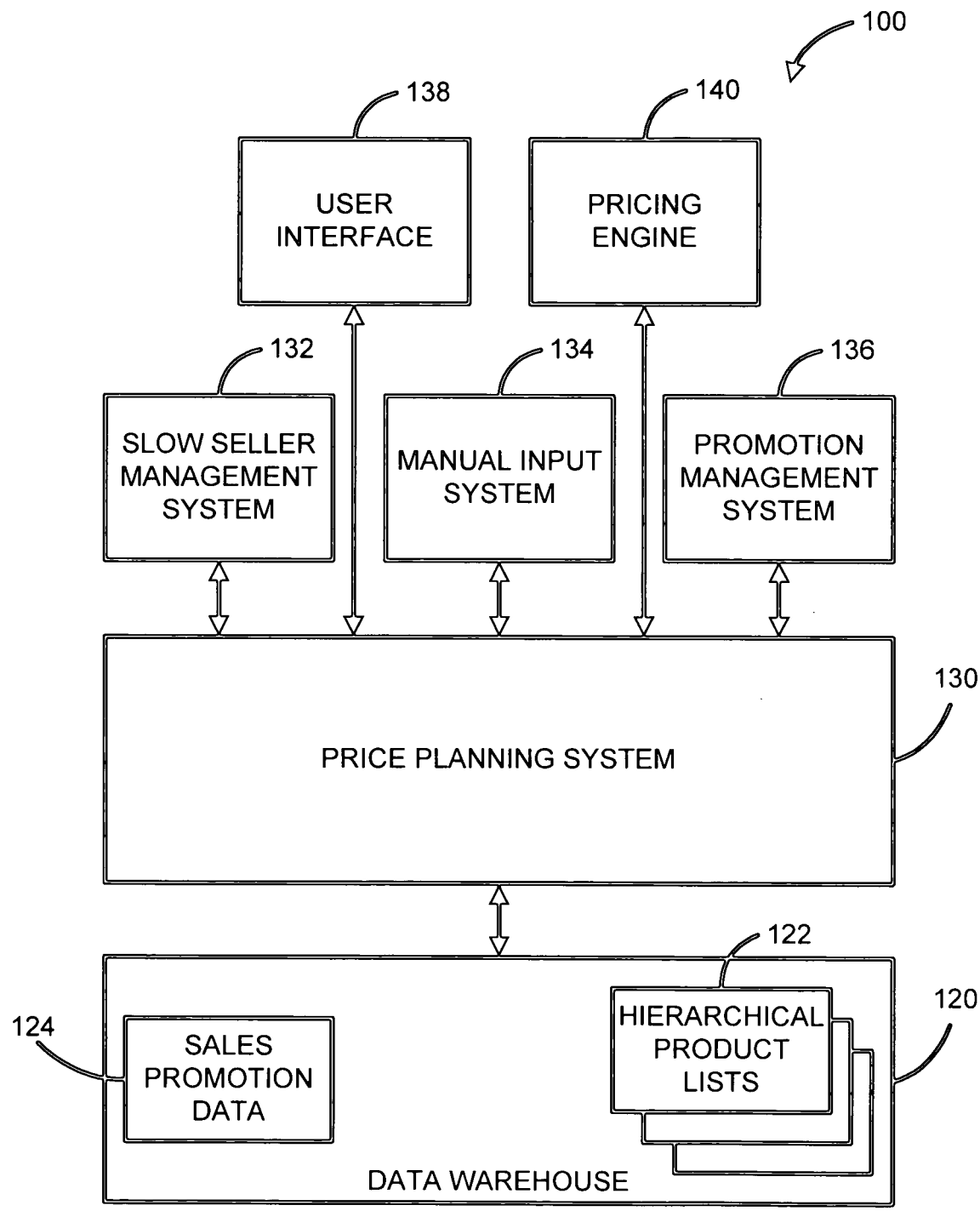
FIG. 1 is a general block diagram illustrating a system for processing data related to a sales promotion according to an exemplary embodiment.

FIG. 1 illustrates a system 100 for processing data related to retail operations and planning. The data can be related products or services that are being or planned to be sold. According to an exemplary embodiment, system 100 is configured for defining a sales promotion. System 100 may be a closed loop system and includes a data warehouse 120 and a price planning system 130.

According to an exemplary embodiment, system 100 may include additional components configured to manage and implement price planning for retail store operation. For example, system 100 may further include additional components such as a procurement engine, a supply engine, a merchandise controlling engine, a valuation engine, etc. The components of system 100 may further be interconnected such that information may be freely exchanged between the components of system 100. According to one embodiment, data is exchanged through data warehouse 120.

System 100 may be further associated with one or more additional external components such as a plurality of cash register systems associated with retail store locations. The cash register systems may be configured to perform a number of functions associated with retail store operation such as pricing implementation, inventory control, data management, etc.

System 100 may be implemented as a single system, a distributed system, or any combination thereof. System 100 may be implemented using a single computing system, a plurality of computing systems, software, hardware, or any other system or combination of systems to perform the functions described herein. Further, the components associated with system 100 may also be implemented using single or multiple systems.

Data warehouse 120 is a data repository configured to receive, sort, process, and store information related to retail operations and planning. For example, in the illustrated embodiment, data warehouse 120 is configured to receive, sort, process, and store hierarchical product lists 122 and sales promotion data 124. Data warehouse 120 may also be implemented using single or multiple systems. Data warehouse 120 may further include one or more functions to permit a user to efficiently organize and retrieve stored data.

Price planning system 130 is preferably a data processing system or software configured to allow one or more users to perform one or more functions, such as retail price planning functions, associated with system 100. Price planning system 130 may be any system configured to facilitate price planning for one or more products within a retail operation. According to an exemplary embodiment, price planning system 130 includes a slow seller management engine 132, a manual pricing engine 134, and a promotion management engine 136, as well as a user interface 138 and pricing engine 140. According to alternative embodiments, price planning system 130 may further include additional, fewer, or different systems to facilitate retail price planning. Communication with data warehouse 120 allows system 130 to obtain inventory data, budget data, and product lists, which may be used by slow seller management engine 132, manual pricing engine 134, and promotion management engine 136 for providing price planning information.

Generally, slow seller management engine 132, manual pricing engine 134, and promotion management engine 136 communicate with price planning system 130 either directly or as downstream processes. System 130 is configured to interface with each engine using custom information for that engine. According to an alternative embodiment, slow seller management engine 132, manual pricing engine 134, and promotion management engine 136 may be implemented as components within price planning system 130.

Slow seller management engine 132 may be any system or method configured to communicate with one or more of a budgeting system, a planning system, an inventory system, and/or any other systems within or in communication with system 100. According to an exemplary embodiment, slow seller management engine 132 is configured to identify and recommend pricing or other strategies for products or inventory that is selling at a slower rate than forecast. Pricing strategies may include recommended markdowns to increase sales and reduce inventory.

Manual pricing engine 134 may be any system or method for generating price planning input based on manual input received from a user. According to an exemplary embodiment a user may utilize a user interface associated with manual pricing engine 134 or user interface 138 to enter one or more price changes such as a new sales price, a percentage change based on the original or current sales price, or an absolute price change by specifying a difference from the original or current sales price. The user may further enter any associated information such as timing information, quantity information, store location information, etc. For example, a manager of a particular retail store may have knowledge of a local fashion trend, indicating that following an automated retail pricing procedure would be detrimental to the retail operation. Manual pricing engine 134 would allow the manager to override the automated pricing procedure by, for example, determining an alternative price for articles or merchandise related to the trend during a particular time period at that particular store.

Promotion management engine 136 may be any system or method for generating price planning information or input in order to define a sales promotion for one or more products. A sales promotion may be a promotion associated with a particular store or grouping of stores, a particular article or grouping of articles, a geographic region, etc. A promotion may include a price change, timing information, article information, store location, or any other information related to the promotion to be implemented.

User interface 138 may be any type of interface configured to allow a user to interact with price planning system 130 and/or any associated components such as slow seller management engine 132, manual pricing engine 134, and promotion management engine 136. User interface 138 may be configured such that each user is assigned to one or more specific budgets, which in turn are assigned to specific articles. The user assignments may be used to define the set of articles that a user is authorized to process. User interface 138 may also be configured to display data such as a hierarchical product list to a user in order to facilitate the defining of a sales promotion.

Pricing engine 140 may be any type of system or method configured to receive a price planning schedule and communicate with one or more components associated with system 100 to implement price changes defined in the price planning schedule. Pricing engine 140 may be further configured to implement functions associated with the price changes such as budget updates, inventory tracking, etc.

Figure 2:
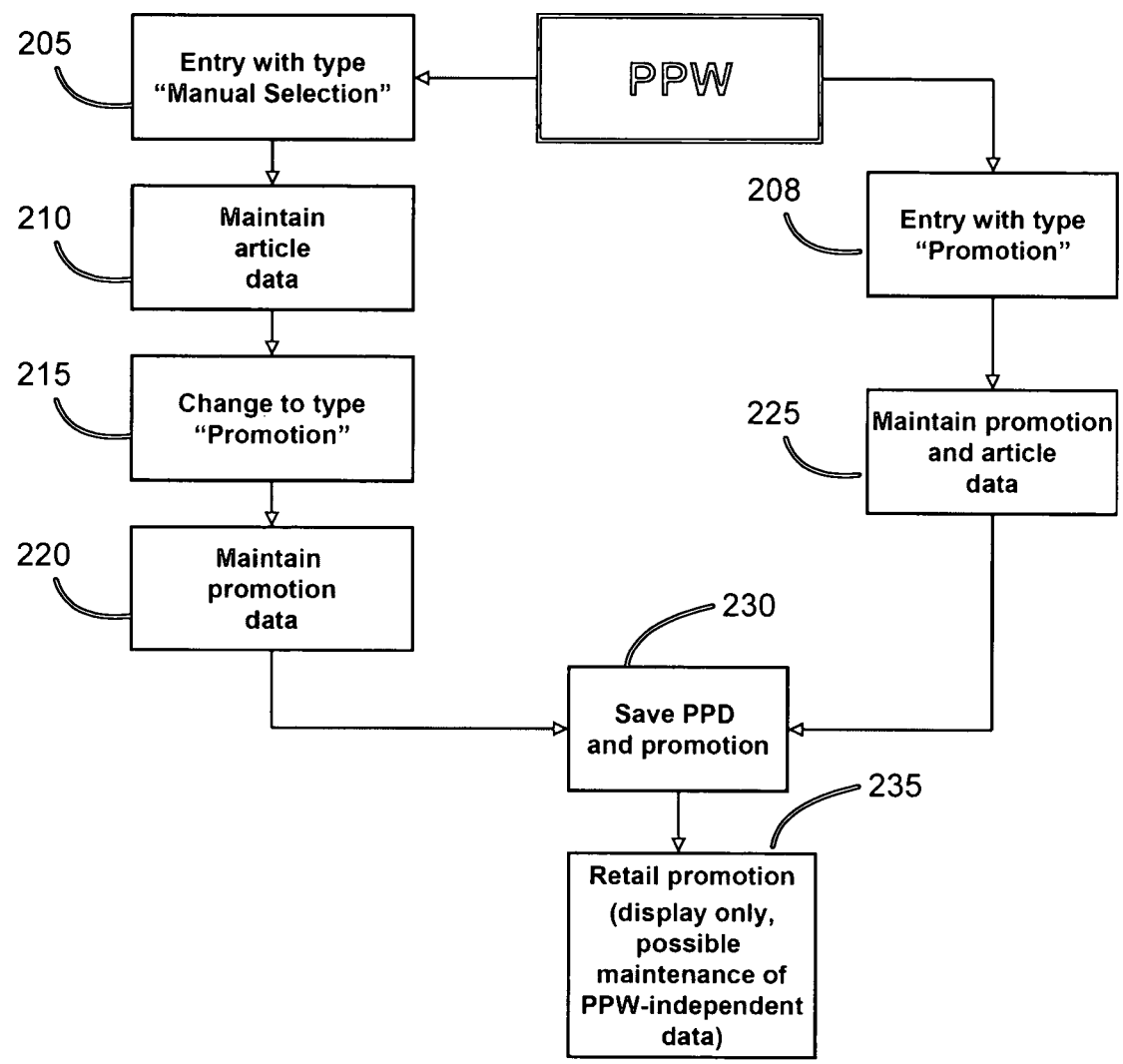
FIG. 2 is a process flow diagram which illustrates two particular methods for defining a sales promotion according to an exemplary embodiment.

FIG. 2 is a process flow diagram which illustrates two particular methods for defining a sales promotion within price planning system 130 according to an exemplary embodiment. In order to achieve a high degree of integration between price planning system 130 and promotion management engine 136, promotion management engine 136 may be configured to be actuated from user interface 138 of price planning system 130. For example, user interface 138 may include a "create promotion" button or icon to allow a user to create a promotion. According to one of the methods, a user utilizes user interface 138 to indicate that a manual price change selection will be used to create a promotion as indicated by step 205. According to the other method, the user indicates that a promotion will be entered directly as indicated by step 208.

Where a manual input selection is made in step 205, product data may be loaded into an edit area of user interface 138 to enable a user to manually edit pricing and/or product data in a step 210. The product data may be in the form of a hierarchical product list structured according to a predetermined product hierarchy structure, as will be described below with regard to FIGS. 4-8. Manually editing pricing and/or product data may include manually entering price changes, timing information, product selections, etc.

Following manual editing in step 210, a user may utilize user interface 138 to create a promotion based upon the manually edited data in a conversion step 215. Upon creation of the promotion, the user may utilize user interface 138 to modify information related to the promotion to be created in a step 220. Modifying information related to promotion may include changing one or more products included in the promotion, timing information, sources included in the promotion, etc.

Where a selection is made to directly enter a promotion in step 208, a promotion may be created in a step 225. Creation of the promotion in step 225 may include loading of product and/or promotion data to the edit area of user interface 138 for manipulation by the user. For example, the user may use the edit area to make changes related to the products and/or changes related to data for the promotion. As with using a manual price change selection to define the promotion, the product data may be in the form of a hierarchical product list structured according to a predetermined product hierarchy structure, as will be described below with regard to FIGS. 4-7.

Following creation of a promotion and related product data in steps 220 or 225, price planning system 130 may be configured to create a price planning document (PPD) and a promotion in a step 230. The price planning document may be distributed and maintained in a step 235.

Figure 3:
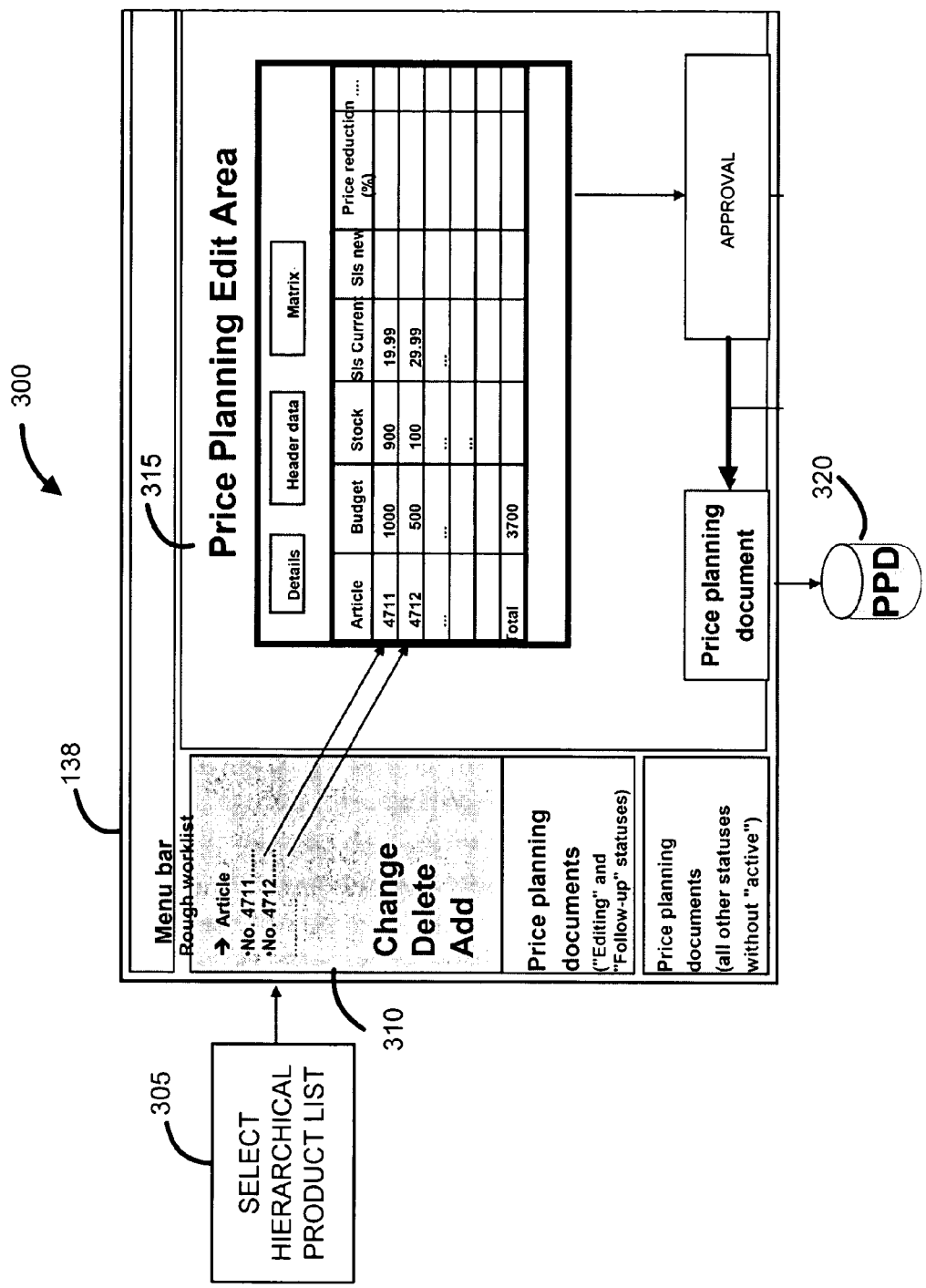
FIG. 3 is a data flow diagram which illustrates in greater detail a process 300 of defining a sales promotion according to an exemplary embodiment.

FIG. 3 is a data flow diagram which illustrates in greater detail a process 300 of defining a sales promotion according to an exemplary embodiment. In the illustrated embodiment, a user may utilize user interface 138 to select a general grouping 305 of retail products or services. Products or services may be selected, for example, by defining specific attributes of desired items (e.g., types, descriptions, etc.), or by selecting a predetermined list of items (e.g., from lists of items stored in data warehouse 120 shown in FIG. 1). As will be described below with regard to FIGS. 4-8, user interface 138 may be utilized to select a hierarchical product list structured according to a predetermined product hierarchy structure (e.g., hierarchical product lists 122 read or written from data warehouse 120 as shown in FIG. 1). The user may navigate through the hierarchical product list to select a particular product or group of products for which price changes are to be implemented. Selected products are initially displayed hierarchically in a rough worklist 310 in user interface 138.

Following selection of the products in step 305 and creation of rough worklist 310, the products in rough worklist 310 may be selectively transferred to an editing area 315 within user interface 138. When products are transferred from rough worklist 310 to editing area 315, the corresponding data from data warehouse 120 is read again and the product is removed from rough worklist 310. Further, the transferred data may be supplemented with additional data from data warehouse 120 or data available through price planning system 130.

Editing area 315 may be utilized to make changes to prices and other attributes of the selected items. As mentioned above, price changes may include a new specific price, a percentage markdown from an existing price, a reduction by a specific amount, etc. Further, price changes may include effective dates or other timing information. For example, a price change may include a series of price changes wherein each price change is set to occur on a specific date. Alternatively, a price change may include more specific information, such as setting a percentage change based on the quantity of a product still in stock at a particular date. User interface 138 may further be utilized to enter additional promotion-relevant data, such as a temporal validity period defining the start and end dates for the promotion, limits on quantities for the selected items, etc., before the data for the items in editing area 315 is approved and stored.

After the data in editing area 315 is approved, it may be saved as a price planning schedule within a price planning document (PPD) 320. Price planning document 320 may be any type of document that includes a price planning schedule and/or other information needed to implement the price changes suggested in the price planning engine worklist. Exemplary information may include article data, stock quantities, associated price markdowns, price activation levels, budget data, etc.

Figure 4:
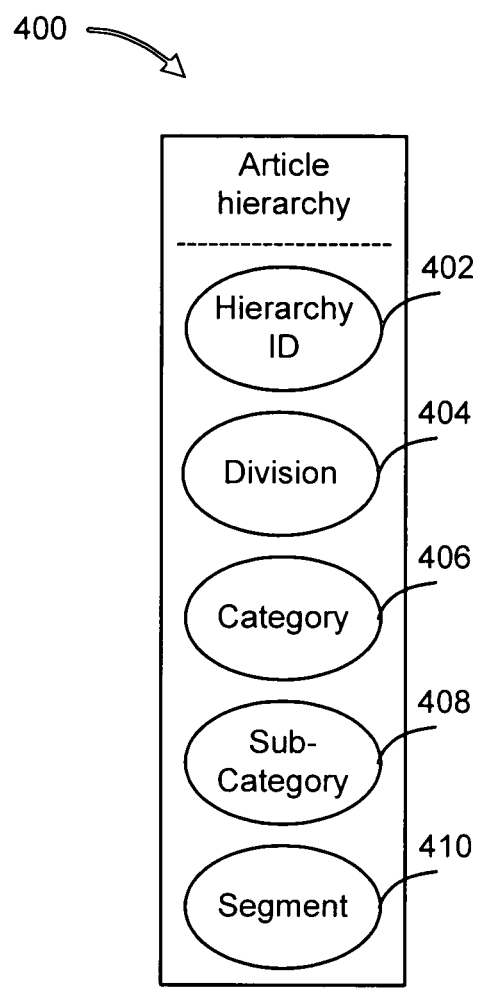
FIG. 4 is a general block diagram illustrating an article hierarchy to which a price level group may be assigned according to according to an exemplary embodiment.

FIG. 4 illustrates a product hierarchy structure in the form of an article hierarchy 400 to which a price level group may be assigned according to an exemplary embodiment. A product hierarchy structure is a data structure comprising multiple levels of abstraction which may be used to group an aggregation of retail products or services hierarchically in a sales oriented structure. Product hierarchy structures are typically determined as part of a general process of assortment planning, which generally involves creating associations between retail products or services and stores based on numerous criteria.

In FIG. 4, article hierarchy 400 is illustrated with a hierarchy ID level (e.g., a number) 402, a division level 404, a category level 406, a subcategory level 408, and a segment level 410. Article hierarchy 400 may be customized by a user to include additional levels (e.g., a subsegment level below segment level 410) or fewer levels, as well as different names, to better represent the merchandise (e.g., products or articles) layout associated with a particular enterprise. According to an exemplary embodiment, article hierarchies may be defined with up to 10 levels.

Although the names and number of levels in article hierarchy 400 can be customized, one level in article hierarchy 400 must be defined as the "category" level. The category level may be selected to represent the independent presentation spaces in a store that are devoted to merchandise categories presented to consumers in a unified manner. In the department store context, for example, the category level in article hierarchy 400 may be selected to represent differentiated groupings of shops in the department stores such as confectionaries, menswear departments, and ladies wear departments. Alternatively, a lower level in article hierarchy 400 may be selected to represent the different independent presentation spaces for subgroups of merchandise (e.g., long-arm blouses, short-arm blouses, trousers) within each shop in a department store. Other criteria for selecting the category level may also be used.

In an exemplary embodiment, the level in article hierarchy 400 selected to be the category level has several additional properties that are unique to that level. One unique property of the category level is that stores can be assigned only to that level. These assignments make sense primarily in the context of department stores, wherein the stores that are assigned to a category are the shops in different department stores which (primarily) present goods from this category. For example, in most department stores there is a section for "men's fashion." Hence, a category may be defined in the system for "men's fashion," and this section in the department store may be treated as a shop in the system.

Another unique property of the category level in article hierarchy 400 is that the assignment of articles (as described in detail below) to article hierarchy 400 must be unique below the category level. That is, each article can be assigned only once to a node at or below a particular category node. By contrast, the same article can be assigned again to a different node at or above the category level (e.g., the division level).

Figure 5:
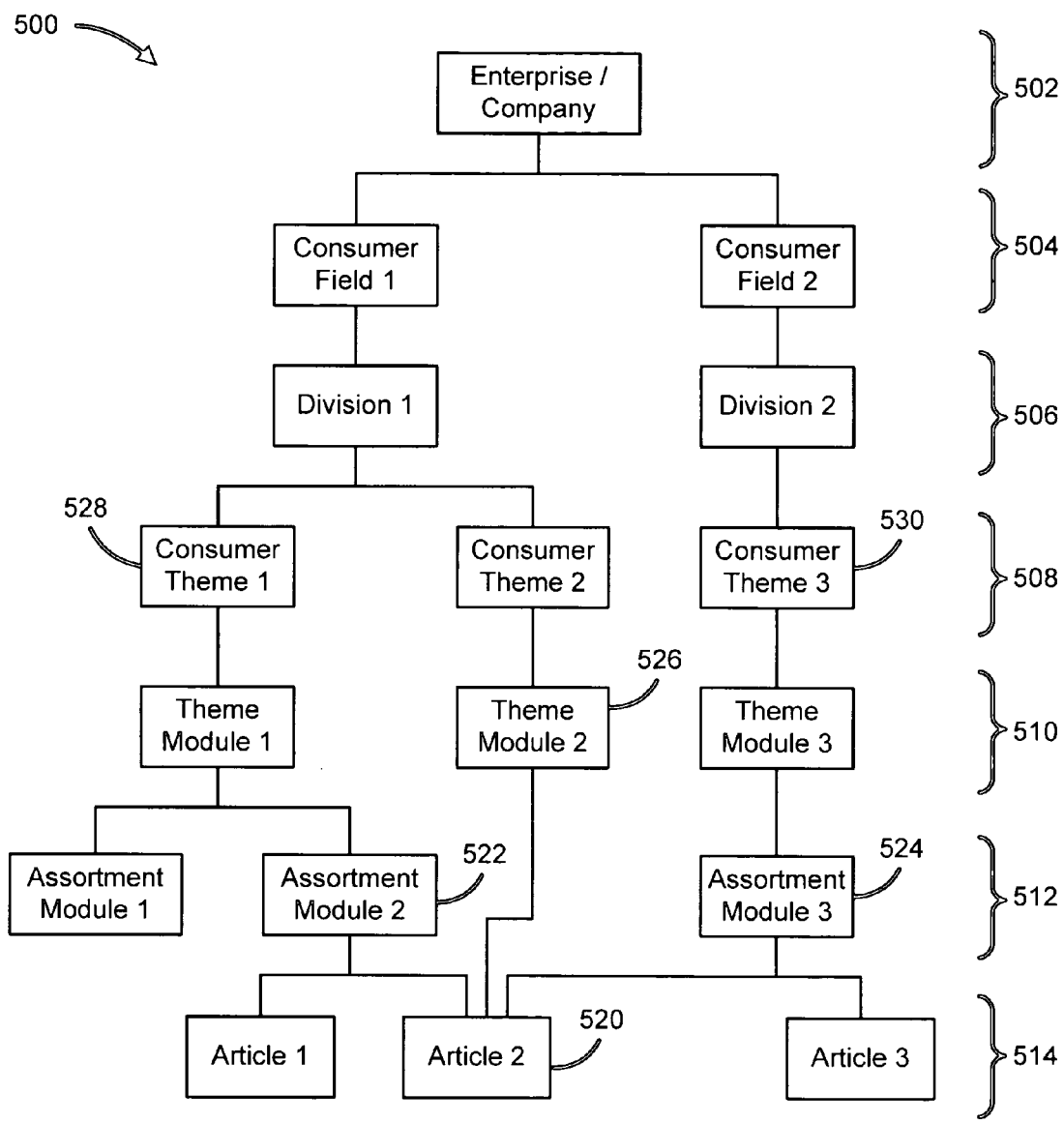
FIG. 5 is a block diagram illustrating the article hierarchy of FIG. 4 in greater detail according to an exemplary embodiment.

To further illustrate, FIG. 5 illustrates an article hierarchy 500, which shows in greater detail an exemplary embodiment of the article hierarchy of FIG. 4. In the illustrated embodiment, article hierarchy 500 has been defined to include seven distinct levels, comprising: an enterprise level 502, a consumer field (CF) level 504, a division level 506, a consumer theme (CT) level 508, a theme module (TM) level 510, an assortment module (AM) level 512, and an article level 514. CF level 504 maybe selected to represent different high level groupings of retail products or services (e.g., fashion, sport). CT level 508 may be selected to represent retail product or service categories presented to consumers in a unified manner, such as the individual shops in a department store. TM level 510 may be selected to represent the different independent presentation spaces for subgroups of merchandise (e.g., long-arm blouses, short-arm blouses, trousers) within each shop in a department store. AM level 512 may be selected to group articles according to various criteria such as the time periods during which such articles will be displayed, the stores to which they will be assigned, etc.

According to an exemplary embodiment, the relationships between the various nodes in article hierarchy 500 may be as follows. The relationship between the nodes of each level above AM level 512 and the node(s) in the next lower level is 1:n. For example, each node in TM level 510 may be assigned or linked to one or more child nodes in AM level 512, while each node in AM level 512 is linked to exactly one parent node in TM level 510. In contrast to the nodes above AM level 512, the relationships between the nodes in AM level 512 and the nodes in Article level 514 may be n:m. That is, a single node in AM level 512 may be linked to one or more child nodes in article level 514, while each node in article level 514 may be linked to one or more parent nodes in AM level 512 so long as each parent node in AM level 512 is in a different category. Thus, in the embodiment illustrated in FIG. 5, article node 520 may be linked to both AM node 522 and AM node 524 in AM level 512 because nodes 522 and 524 are assigned to different categories. In particular, AM node 522 is assigned to the category represented by CT node 528 and AM node 524 is assigned to the category represented by CT node 530. In some embodiments, individual articles in article level 514 may be assigned directly to nodes above AM level 512. For example, article node 520 may be linked directly to TM node 526. This assignment is permissible because TM node 526 is assigned to a different category than either CT node 528 or 530. In an exemplary embodiment, the user can set a flag to indicate whether the assignment of individual article nodes to more than one parent node in AM level 512 and/or to other higher level nodes is allowable or prohibited.

Figure 6:
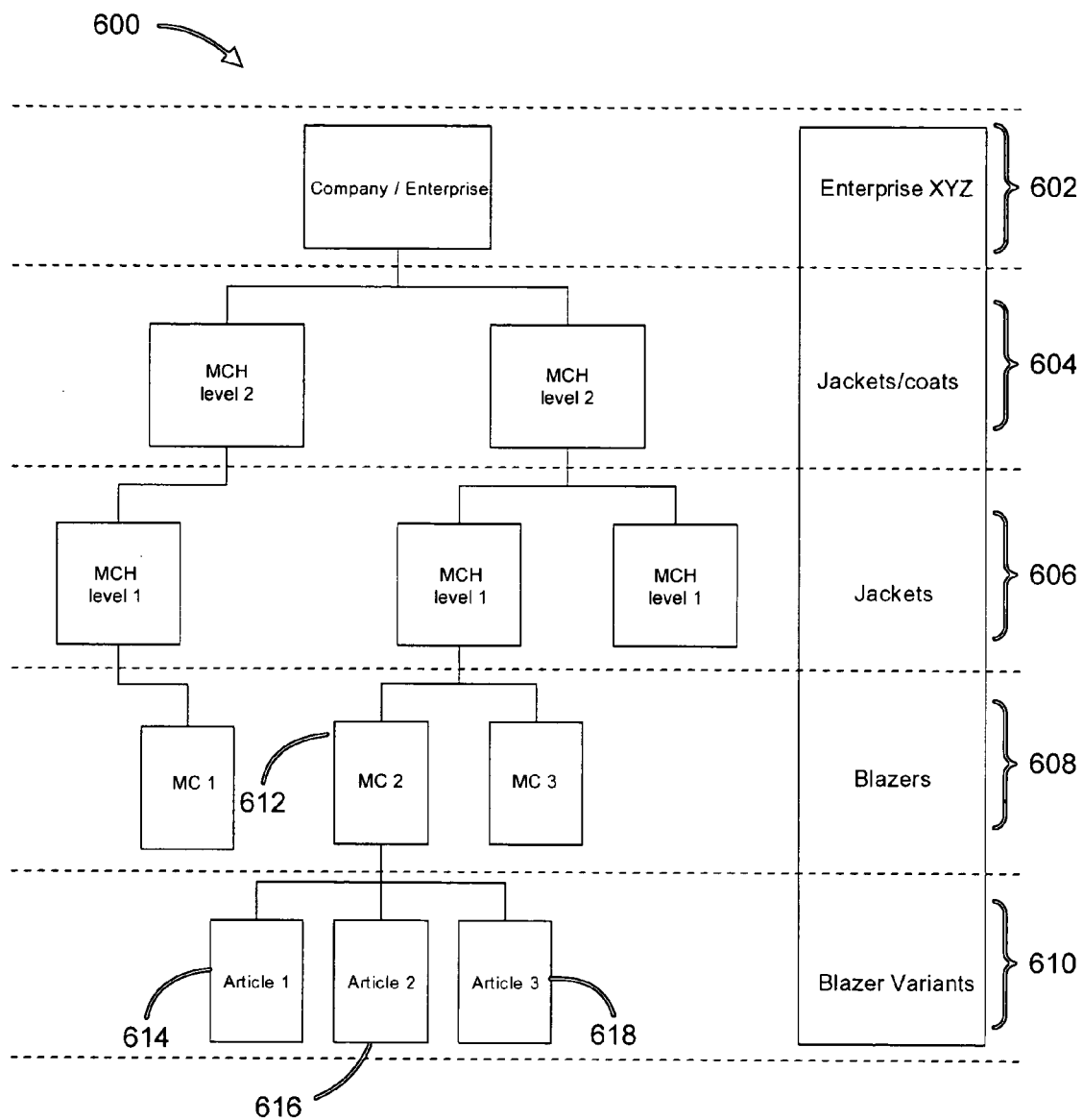
FIG. 6 is a block diagram illustrating a merchandise hierarchy according to an exemplary embodiment.

Article hierarchies, such as article hierarchy 500 represent only one of may possible ways to hierarchically organize and view retail products and services. For example, FIG. 6 illustrates a merchandise hierarchy 600 according to an exemplary embodiment. Merchandise hierarchy 600 represents a long-term retail product or service grouping in a classification structure that is independent of a store structure or layout. Instead, retail products or services are grouped in merchandise hierarchy 600 based on common inherent characteristics (e.g., all beverages may be grouped together regardless of their type and how or where they are displayed in the stores).

In the illustrated embodiment, a merchandise (MC) level 608 represents the lowest level in merchandise hierarchy 600. This means that different articles that are assigned to the same MC node usually have at least the same characteristic(s) represented by the MC node. For example, articles 614, 616 and 618 (comprising three blazers having different styles, sizes and/or colors) in an article level 610 are assigned to a single MC node 612 and thus have at least the same characteristic(s) (e.g., they are all blazers) represented by MC node 612. According to an exemplary embodiment, each article is assigned to exactly one MC node in merchandise hierarchy 600, and multiple MC nodes can be grouped together to form merchandise hierarchy (MCH) levels. For example, merchandise hierarchy 600 is illustrated with a MCH level 606 (comprising a "jackets" category) immediately above MC level 608, and a higher MCH level 604 (comprising a "jackets/coats" category) above MCH level 606. Similar to article hierarchy 400 (shown in FIG. 4), the topmost layer in merchandise hierarchy 600 is an enterprise level 602. The nodes in the lowermost level in merchandise hierarchy 600 and in similar merchandise hierarchies may be referred to as merchandise categories. Thus, categories may represent differentiated, independently controllable groups of retail products and/or services that consumers recognize as different and/or exchangeable to satisfy a need.

A merchandise hierarchy may be formed for various reasons. For example, it may be formed to: (i) plan an assortment (as described in detail below), (ii) enable structured analyses in the information system and the planning of target and actual values at the MC level, and (iii) save common data (such as conditions) at superior levels to reduce storage space. According to an exemplary embodiment, the following information may be defined for each MC node: price, color, and size groups; validity periods; n characteristics, and status values. In this embodiment, colors may be saved hierarchically as main colors or single colors. The main colors can have various characteristic values, which represent the single colors. In this case, the single colors are variant-creating characteristics. Accordingly, a merchandise hierarchy having this structure would allow for analysis of main colors, single colors, and attribute values.

The characteristics of articles in a merchandise hierarchy may be used for classification. Characteristics represent defined properties of an object, such as the color of a blouse. Characteristics help to differentiate objects from one another and find specific articles in the information system (e.g., list all articles with characteristic value "Red" of the "Color" characteristic). Characteristics can be either variant-creating (i.e., used in the definitions of the article variants) or purely informative. According to an exemplary embodiment, two or three-dimensional variant-creating characteristics can be defined for each MC node.

According to another embodiment, below the MC level, and thus below the entire merchandise hierarchy, characteristic profiles may be defined to segment or specialize the merchandise hierarchy. This may be done to simplify the creation of new generic articles, variants, and single articles.

In this embodiment, a characteristic profile may be used to define the set of values for a characteristic that are permitted in that particular profile. For example, a characteristic profile called "Ladies' sizes, Germany" could define the sizes 34 to 48. Multiple characteristic profiles can be created for multiple nodes in merchandise hierarchy 600. A characteristic profile can be assigned several times within the merchandise hierarchy. Thus, every article that is assigned to a node in merchandise hierarchy 600 can optionally be assigned to a characteristic profile. According to an exemplary embodiment, the relationship between characteristic profiles and nodes in merchandise hierarchy 600 is n:m. That is, a single characteristic profile can be linked to multiple nodes in merchandise hierarchy 600, and vice versa.

As persons skilled in the art will appreciate, the use of characteristic profiles provides several advantages. For example, characteristic profiles can be used to (i) group sets of colors and sizes, (ii) assign them to the relevant nodes in merchandise hierarchy 600, and (iii) select the suitable profile when creating articles.

Figure 7:
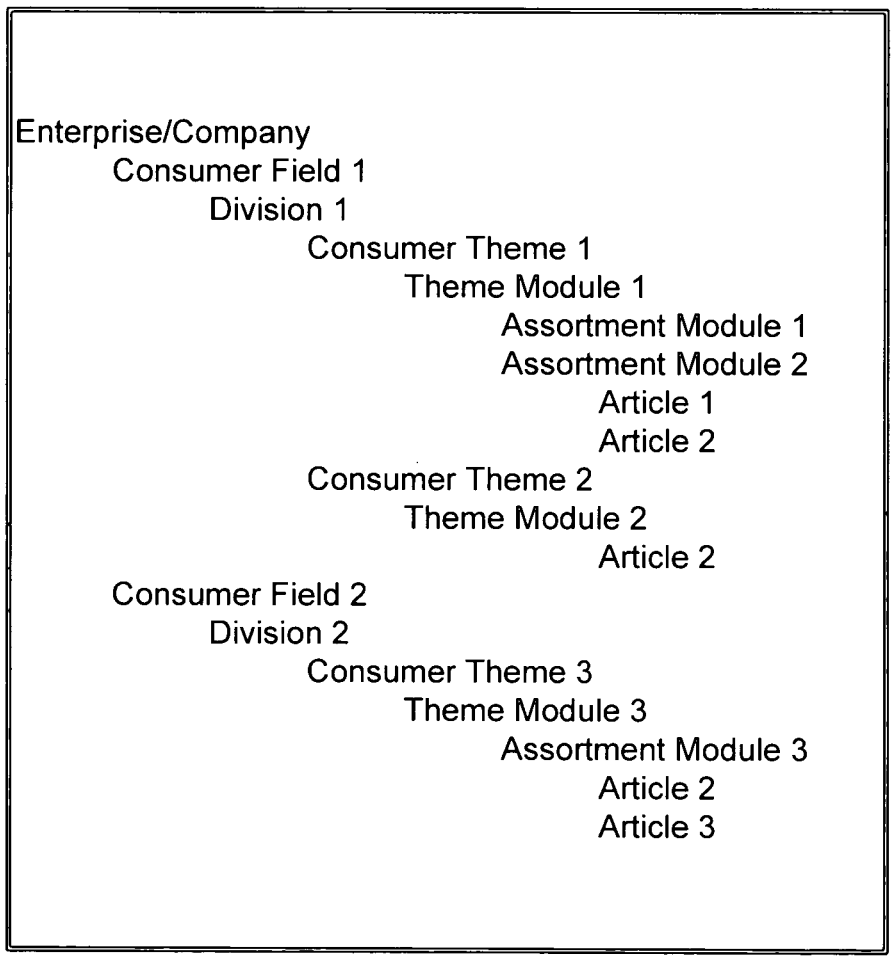
FIG. 7 illustrates a hierarchical product list based on a product hierarchy structure according to an exemplary embodiment.

FIG. 7 illustrates an exemplary hierarchical product list 700 which may be based on, for example, article hierarchy 500 (shown in FIG. 5) or another product hierarchy structure such as merchandise hierarchy 600 (shown in FIG. 6), and which may be used to determine products to be included in a sales promotion. For example, in the illustrated embodiment, hierarchical product list 700 is based on article hierarchy 500 (shown in FIG. 5) and is received by price planning system 130 from data warehouse 120 and displayed to a user via user interface 138 (shown in FIG. 1). Product hierarchy list 700 includes a corresponding hierarchical list entry for each of the nodes and articles included in article hierarchy 500.

In an exemplary embodiment, a sales promotion may be defined using hierarchical product list 700 by selecting any hierarchical product level or node therein and, for each node selected, products or articles associated with the selected node are included in the sales promotion. That is, for each node selected, products or articles associated with each child node representing the lowest level or end node below the selected node will be included in the sales promotion. For example, if the node "Assortment Module 2" is selected, the resulting sales promotion will be defined to include "Article 1" and "Article 2."

According to another exemplary embodiment, hierarchical product list 700 may be used to define two or more sales promotions having varying levels or degrees of specificity. In this embodiment, a general sales promotion may be defined by selecting a node in one level of hierarchical product list 700, and then one or more child nodes in one or more levels below the general sales promotion may be selected to define a more specific sales promotion or group of sales promotions within the general sales promotion. For example, in one embodiment, a general sales promotion may be defined by selecting the node "Theme Module 1" from hierarchical product list 700, and then a more specific sales promotion may be defined within the general sales promotion to include only "Article 1" and "Article 2" by selecting the these nodes from hierarchical product list 700.

According to an exemplary embodiment, each of the more specific sales promotions within a general sales promotion may include differing values for one or more parameters associated with the general sales promotion. Such parameters may include, for example, sales prices (i.e., markdowns) or validity periods for the sales promotion. For example, in one embodiment, a general sales promotion may be defined by selecting the node "Theme Module 1" from hierarchical product list 700, where "Theme Module 1" includes long-arm blouses. A more specific sales promotion may be then be defined by selecting the node "Assortment Module 1," where "Assortment Module 1" includes red long-arm blouses. The more specific sales promotion may then be defined to include a sales price or markdown for red long-arm blouses which is different from the sales price or markdown for the general sales promotion on long-arm blouses. In another embodiment, a general sales promotion may be defined by selecting the node "Theme Module 1" from hierarchical product list 700, where "Theme Module 1" includes long-arm blouses, and wherein the general sales promotion is defined with a validity period of August 1-14. More specific sales promotions may then be defined by selecting nodes "Assortment Module 1" and "Assortment Module 2." The more specific sales promotion for node "Assortment Module 1" may be defined with a validity period from, for example, August 1-7, and the more specific sales promotion for "Assortment Module 2" may be defined with a validity period of, for example, August 7-14.

Figure 8:
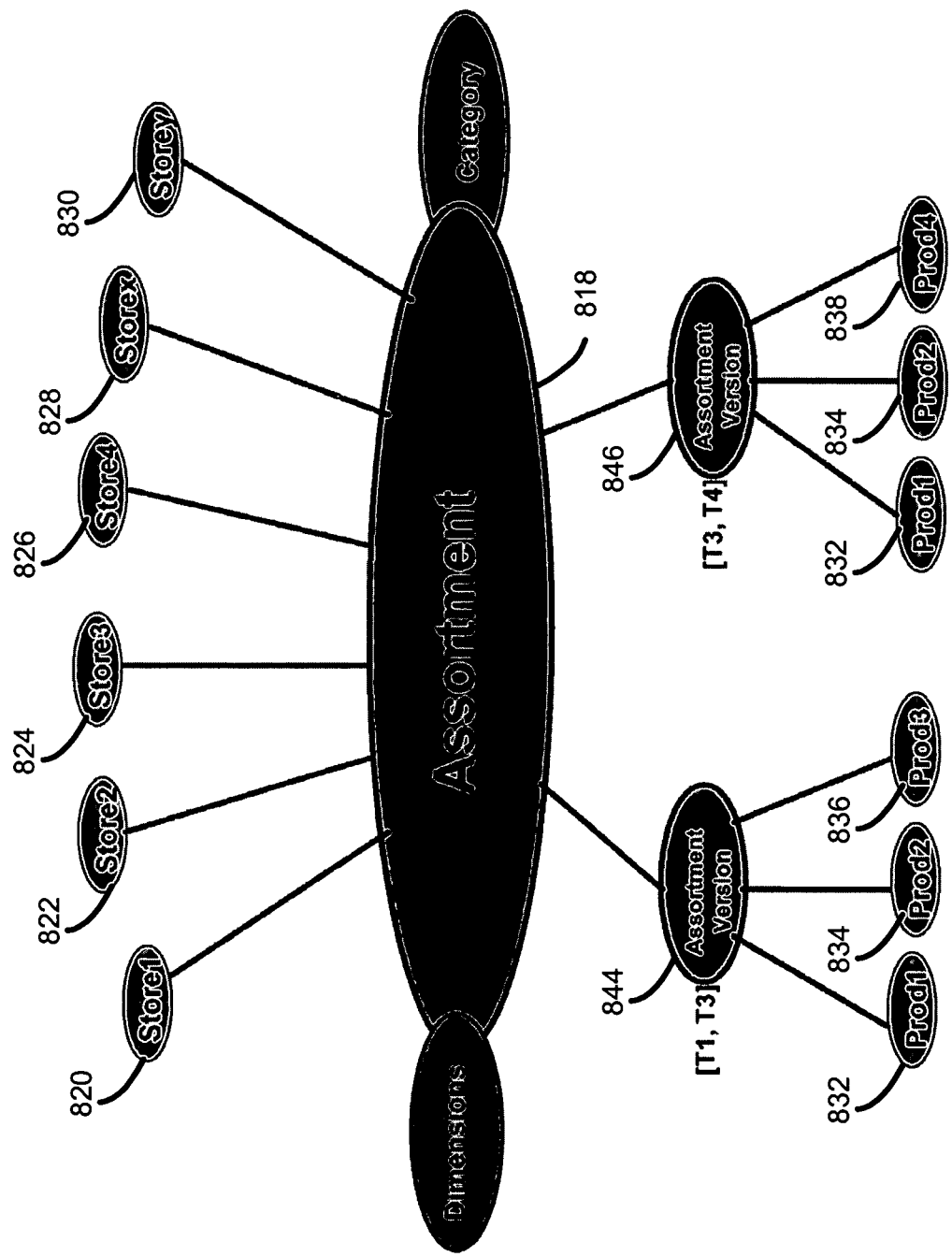
FIG. 8 is a diagram which illustrates a global assortment that links together a plurality of stores and a plurality of products at specific times according to an exemplary embodiment.

As noted above, product hierarchy structures are typically determined as part of a general process of assortment planning, which generally involves creating associations between retail products or services and stores based on numerous criteria. FIG. 8 diagrammatically illustrates an exemplary global assortment 818 that links together a plurality of stores 820, 822, 824, 826, 828, and 830 and a plurality of retail products or services 832, 834, 836, and 838. According to an exemplary embodiment, retail products and services are always linked to an assortment (either global or local) rather than directly to a particular store.

Retail products or services 832-838 are linked to assortment 818 by assortment versions 844 and 846. According to an exemplary embodiment, assortment versions 844 and 846 may include retail products or services that are hierarchically grouped according to a product hierarchy structure. In the illustrated embodiment, each of assortment versions 844 and 846 is active or valid for specified period of time (e.g., valid-from/valid-to dates). For example, retail products or services 832, 834 and 836 are linked to assortment 818 by assortment version 844, which is active between dates/times T1 and T3. Similarly, retail products or services 832, 834 and 838 are linked to assortment 818 by assortment version 846, which is active between dates/times T3 and T4. As persons skilled in the art will recognize, the foregoing time dependencies of the assignments of retail products or services 832-838 to assortment 818 provides for automatic regular (e.g., every month or six weeks) releases of merchandise in the stores to maintain assortment freshness.

According to an exemplary embodiment, assortment versions 844 and 846 may include differing groups of retail products or services that are hierarchically grouped according to a hierarchical product structure, such as article hierarchy 500 (shown in FIG. 5) based on "seasonal" attributes of the various products. A "season" refers to a specific time period with specific assortment characteristics. Each season, in turn, may be characterized by a season category and a season year. For example, a season may be characterized according to a calendar (e.g., fall/winter 2003 and spring/summer 2004) or based on a special event (e.g., Christmas 2004). Thus, in one embodiment, assortment version 844 may contain a hierarchical grouping of products associated with "fall/winter 2003" and assortment version 846 may contain another hierarchical grouping of products associated with "spring/summer 2004."

In one exemplary embodiment, a sales promotion may be defined based on the seasonal characterization of a particular hierarchical grouping of products. For example, a user may "select spring/summer 2004" (e.g., via user interface 138 shown in FIG. 3), which may correspond to assortment version 846. The hierarchical list of products associated with assortment version 846 may then be displayed to the user, who may then define the sales promotion from the hierarchical product list.

In this way, a sales promotion may be flexibly defined to match a particular grouping of stores and retail products or services at any desired level in the product hierarchy structure during a desired period of time. Thus, the number of sales promotions, as well as the scope of each promotion may be minimized and/or selectively defined according to sales performance of different products at a number of different levels within a sales organization, and within a number of specific retail product or service groupings. Accordingly, revenue reductions due to sales promotions are minimized and inventory reduction is improved.

While promotions may be defined according to theme hierarchy structures and merchandise group hierarchy structures, other sales-oriented structures may further be used to define a sales promotion. For example, in one embodiment, a sales promotion may be defined according to a "site group." A "site" generally refers to an organizational unit where product movement takes place, such as a distribution center or store, or a geographic location such as a city, state, region, country, etc. According to an exemplary embodiment, a user may select a predefined grouping of sites (i.e., a "site group") created according to a predetermined classification system that is independent of, for example, price planning system 130. The classification system is used, for example, to define groupings of retail sites that may generally be used for sales-oriented processes not limited to sales promotions. Site groups originally created according to such a classification system are referred to herein as "class-system" site groups. Once the particular site group has been identified by a user, a hierarchical list of products associated with that site group may be used to define the sales promotion. If changes are made to a class system site group, these changes will be reflected in all promotions based in the class system site group.

According to another exemplary embodiment, a user may create a promotion-specific site group as part of the sales promotion definition process. In this embodiment, the promotion-specific site group is created according to one or more user-selected criteria, such as a geographic site location or region, and is independent of any predetermined class system or any other site group created according to the class system. For example, in one embodiment, a class system site group may be used as a template for a promotion-specific site group. In this embodiment, the user may select a particular predefined class system site group to use as a "template", and then modify a copy of the predefined site group according to a user-selected criterion or other user preference to create a promotion-specific site group that is independent of the class system site group. In another embodiment, the promotion-specific site group may be created according to a user-selected criterion or other preference without reference to a predefined class system site group. In either embodiment, the promotion-specific site group is independent of any predetermined class system or any other site group created according to the class system, e.g., the promotion-specific site group may be created or changed within the promotion definition process without affecting any other site group, and changes to any other site group will not affect the promotion-specific site group.

In this way, a sales promotion may be flexibly designed according to any desired grouping of sites, and the promotion will be independent of any predefined grouping of sites such that changes to the predefined group of stores will not affect the promotion, and vice versa. Thus, the number of sales promotions, as well as the scope of each promotion may be minimized and/or selectively defined without interfering with other sales promotions.

Figure 9:
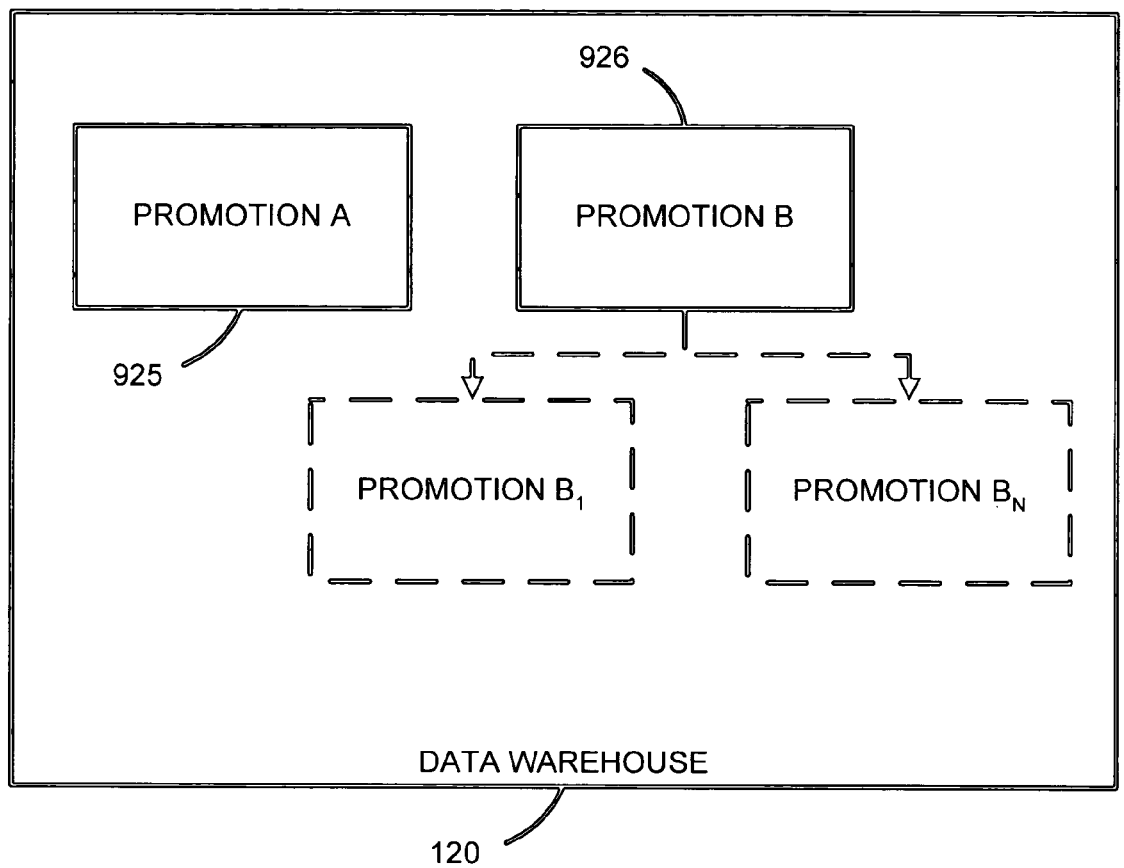
FIG. 9 is a data flow diagram illustrating storage of sales promotion data in a data warehouse for reporting purposes according to an exemplary embodiment.

FIG. 9 illustrates storage of sales promotion data in data warehouse 120 for reporting purposes according to an exemplary embodiment. Sales promotion data may be written to data warehouse 920 as a single promotion. For example, in the illustrated embodiment, data warehouse 120 includes sales promotion data 925 for sales promotion A. Sales promotion data 925 for sales promotion A includes data for only one sales promotion, i.e., sales promotion A, which has been written to data warehouse 120 for reporting purposes. Alternatively, sales promotion data for groups of related sales promotions may be grouped as a higher-level promotion and stored in data warehouse 120 for reporting purposes. For example, a sales organization may choose to group promotion data from a specific Spring promotion for retail products or services in a particular region with promotion data from specific Spring promotions for retail products or services in other regions as a higher level "Spring" promotion to view overall profits from all of these promotions. Any number of related sales promotions may be grouped together in a higher-level promotion for reporting purposes. For example, in the illustrated embodiment, sales promotion data 926 for sales promotion B includes sales promotion data for related sales promotions $B_1$ and $B_N$. In this way, sales promotions may be individually tracked and reported, or may be grouped together for centralized reporting, which may provide for more efficient sales promotion management.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A non-transitory computer-readable storage medium comprising instructions stored therein that, when executed, cause one or more processors to implement a method of defining a sales promotion for a plurality of items, the method comprising:
   determining a group of sales promotion sites to be included in the sales promotion from a plurality of sites, wherein the plurality of sites have been previously organized according to a predetermined site grouping structure, and wherein the group of sales promotion sites is independent of the predetermined site grouping structure;
   determining a list of items associated with the group of sales promotion sites, wherein the list of items associated with the group of sales promotion sites is a hierarchical list of items, and wherein the hierarchical list is structured according to a hierarchical structure which includes a plurality of levels;

determining the items to be included in the sales promotion from the list of items associated with the group of sales promotion sites, wherein the items to be included in the sales promotion are determined based on a user selection of at least one of the plurality of levels of the hierarchical structure, wherein the items to be included in the sales promotion include items in a lower level of the at least one selected level in the hierarchical structure;

determining an automatic retail pricing procedure for the group of sales promotion sites; and overriding the automatic retail pricing procedure for a first site for merchandise related to a trend;

wherein the sales promotion comprises a general sales promotion and a specific sales promotion, the general sales promotion having a plurality of parameters associated therewith including a first sales discount and a first validity period and the specific sales promotion having a plurality of parameters associated therewith including a second sales discount and a second validity period, wherein the second validity period of the specific sales promotion differs from the first validity period for the general sales promotion, wherein a first set of one or more dates associated with the second validity period for the specific sales promotion is included within a second set of one or more dates associated the first validity period for the general sales promotion, wherein determining the items to be included in the sales promotion comprises:

determining a list of items to be included in the general sales promotion from the list of items associated with the group of sales promotion sites, wherein the list of items to be included in the general sales promotion is determined based on a user selection of at least one of the plurality of levels of the hierarchical structure, wherein the items to be included in the general sales promotion include items in a lower level than the at least one selected level in the hierarchical structure; and determining a list of items to be included in the specific sales promotion from the list of items to be included in the general sales promotion, wherein the list of items to be included in the specific sales promotion is determined based on a user selection of at least one node in a lower level than the at least one selected level in the hierarchical structure.

2. The non-transitory computer-readable storage medium of claim 1, wherein the group of sales promotion sites is determinable based on a geographic location of each site.

3. The non-transitory computer-readable storage medium of claim 1, wherein the group of sales promotion sites is determinable in response to user input.

4. The non-transitory computer-readable storage medium of claim 3, wherein the group of sales promotion sites is determinable in response to user input received from a graphical user interface.

5. The computer-readable storage medium of claim 1, wherein the group of sales promotion sites is determinable based on the predetermined site grouping structure.

6. The computer-readable storage medium of claim 1, wherein the list of items includes at least one of a service and a retail product.

7. A program product for defining a sales promotion for a plurality of items, said program product comprising non-transitory computer-readable storage media including program code for causing, when executed, one or more machines to perform the following method steps:

determining a group of sales promotion sites to be included in the sales promotion from a plurality of sites, wherein the plurality of sites have been previously organized according to a predetermined site grouping structure, and wherein the group of sales promotion sites is independent of the predetermined site grouping structure;

determining a list of items associated with the group of sales promotion sites, wherein the list of items associated with the group of sales promotion sites is a hierarchical list of items, and wherein the hierarchical list is structured according to a hierarchical structure which includes a plurality of levels;

determining the items to be included in the sales promotion from the list of items associated with the group of sales promotion sites, wherein the items to be included in the sales promotion are determined based on a user selection of at least one of the plurality of levels of the hierarchical structure, wherein the items to be included in the sales promotion include items in a lower level of the at least one selected level in the hierarchical structure;

determining an automatic retail pricing procedure for the group of sales promotion sites; and overriding the automatic retail pricing procedure for a first site for merchandise related to a trend;

wherein the sales promotion comprises a general sales promotion and a specific sales promotion, the general sales promotion having a plurality of parameters associated therewith including a first sales discount and a first validity period and the specific sales promotion having a plurality of parameters associated therewith including a second sales discount and a second validity period, wherein the second validity period of the specific sales promotion differs from the first validity period for the general sales promotion, wherein a first set of one or more dates associated with the second validity period for the specific sales promotion is included within a second set of one or more dates associated the first validity period for the general sales promotion, wherein determining the items to be included in the sales promotion comprises:

determining a list of items to be included in the general sales promotion from the list of items associated with the group of sales promotion sites, wherein the list of items to be included in the general sales promotion is determined based on a user selection of at least one of the plurality of levels of the hierarchical structure, wherein the items to be included in the general sales promotion include items in a lower level than the at least one selected level in the hierarchical structure; and determining a list of items to be included in the specific sales promotion from the list of items to be included in the general sales promotion, wherein the list of items to be included in the specific sales promotion is determined based on a user selection of at least one node in a lower level than the at least one selected level in the hierarchical structure.

8. The program product of claim 7, wherein the group of sales promotion sites is determinable based on the geographic location of each site.

9. The program product of claim 7, wherein the group of sales promotion sites is determinable in response to user input.

10. The program product of claim 9, wherein the group of sales promotion sites is determinable in response to user input received from a graphical user interface.

11. The program product of claim 7, wherein the group of sales promotion sites is determinable based on the predetermined site grouping structure.

12. The program product of claim 7, wherein the list of items includes at least one of a service and a retail product.

13. A system for defining a sales promotion for a plurality of items, the system comprising:

means for determining a group of sales promotion sites to be included in the sales promotion from a plurality of sites, wherein the plurality of sites have been previously organized according to a predetermined site grouping structure, and wherein the group of sales promotion sites is independent of the predetermined site grouping structure;

means for determining a list of items associated with the group of sales promotion sites, wherein the list of items associated with the group of sales promotion sites is a hierarchical list of items, and wherein the hierarchical list is structured according to a hierarchical structure which includes a plurality of levels;

means for determining the items to be included in the sales promotion from the list of items associated with the group of sales promotion sites, wherein the items to be included in the sales promotion are determined based on a user selection of at least one of the plurality of levels of the hierarchical structure, wherein the items to be included in the sales promotion include items in a lower level of the at least one selected level in the hierarchical structure;

means for determining an automatic retail pricing procedure for the group of sales promotion sites; and means for overriding the automatic retail pricing procedure for a first site for merchandise related to a trend;

wherein the sales promotion comprises a general sales promotion and a specific sales promotion, each of the general sales promotion and specific sales promotion having a plurality of parameters associated therewith including a sales price and a validity period, wherein the validity period of the specific sales promotion differs from the validity period of the general sales promotion, wherein a first set of one or more dates associated with the validity period of the specific sales promotion is included within a second set of one or more dates associated the validity period of the general sales promotion, wherein the means for determining the items to be included in the sales promotion comprises:

means for determining a list of items to be included in the general sales promotion from the list of items associated with the group of sales promotion sites, wherein the list of items to be included in the general sales promotion is determined based on a user selection of at least one of the plurality of levels of the hierarchical structure, wherein the items to be included in the general sales promotion include items in a lower level than the at least one selected level in the hierarchical structure; and means for determining a list of items to be included in the specific sales promotion from the list of items to be included in the general sales promotion, wherein the list of items to be included in the specific sales promotion is determined based on a user selection of at least one node in a lower level than the at least one selected level in the hierarchical structure.

14. The system of claim 13, wherein the group of sales promotion sites is determined based on the geographic location of each site.

15. The system of claim 13, wherein the group of sales promotion sites is determined in response to user input.

16. The system of claim 15 wherein the group of sales promotion sites is determinable in response to user input received from a graphical user interface.

17. The system of claim 13, wherein group of sales promotion sites is determinable based on the predetermined site grouping structure.

18. The system of claim 13, wherein the list of items includes at least one of a service and a retail product.

* * * * *